US011975458B2

(12) United States Patent
Mueller et al.

(10) Patent No.: US 11,975,458 B2
(45) Date of Patent: May 7, 2024

(54) SEPARATING DEVICE

(71) Applicant: Albert Handtmann Maschinenfabrik GmbH & Co. KG, Biberach (DE)

(72) Inventors: Stefan Mueller, Hohentengen (DE); Peter Willburger, Baindt (DE); Michael Heim, Biberach (DE); Robin Volz, Unlingen (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 190 days.

(21) Appl. No.: 17/357,721

(22) Filed: Jun. 24, 2021

(65) Prior Publication Data

US 2021/0402632 A1 Dec. 30, 2021

(30) Foreign Application Priority Data

Jun. 26, 2020 (EP) .................................... 20182610

(51) Int. Cl.
*B26D 1/06* (2006.01)
*B26D 1/01* (2006.01)

(52) U.S. Cl.
CPC ............. *B26D 1/065* (2013.01); *B26D 1/015* (2013.01)

(58) Field of Classification Search
CPC .......... B26D 1/385; B26D 1/04; B26D 1/015; B26D 1/06; B26D 1/065; B65G 47/1492; B65B 25/08
See application file for complete search history.

(56) References Cited

U.S. PATENT DOCUMENTS

| | | | | |
|---|---|---|---|---|
| 3,977,280 A * | 8/1976 | Mundt | G03D 15/04 | 83/578 |
| 4,181,055 A * | 1/1980 | Miyata | B26D 1/095 | 83/350 |
| 4,236,855 A * | 12/1980 | Wagner | B65B 25/08 | 414/789.5 |
| 5,768,857 A * | 6/1998 | Ward | B65B 25/08 | 53/531 |
| 7,631,673 B2 * | 12/2009 | Salovaara | B26D 7/025 | 83/622 |
| 11,377,245 B2 * | 7/2022 | Ward | A22C 17/0093 | |

(Continued)

FOREIGN PATENT DOCUMENTS

| | | |
|---|---|---|
| CN | 207189772 U | 4/2018 |
| JP | S49108686 A | 10/1974 |

(Continued)

OTHER PUBLICATIONS

Japanese Patent Office, Office Action Issued in Application No. 2021-102992, dated May 10, 2022, 13 pages. (Submitted with Machine Translation).

*Primary Examiner* — Jennifer S Matthews
(74) *Attorney, Agent, or Firm* — McCoy Russell LLP

(57) ABSTRACT

The invention relates to a device for cutting a base web with a separating device as well as a corresponding method, where the separating device can cut a base web into individual bases which can be guided under a fresh product. The separating device comprises a knife device and a counter cutting device, each of which comprise at least two cutting edges. The knife device and/or the counter cutting devices can be moved to and fro in two directions.

17 Claims, 8 Drawing Sheets

(56) References Cited

U.S. PATENT DOCUMENTS

| | | | | |
|---|---|---|---|---|
| 2011/0284341 | A1* | 11/2011 | Saastamo | B65G 13/04<br>198/460.1 |
| 2012/0312660 | A1* | 12/2012 | Harder | B26D 7/32<br>198/690.1 |
| 2015/0053057 | A1* | 2/2015 | Dreier | B65H 35/08<br>83/437.2 |
| 2016/0031115 | A1* | 2/2016 | Heinz | B27B 1/002<br>83/13 |
| 2017/0022023 | A1* | 1/2017 | Littlejohns | B26F 3/02 |

FOREIGN PATENT DOCUMENTS

| | | | | |
|---|---|---|---|---|
| JP | H033795 | A | 1/1991 | |
| WO | 2004001867 | A1 | 12/2003 | |
| WO | WO-2004018167 | A1 * | 3/2004 | B26D 1/095 |
| WO | WO-2007012827 | A1 * | 2/2007 | B26F 3/02 |

* cited by examiner

SEPARATING DEVICE

CROSS REFERENCE TO RELATED APPLICATION

The present application claims priority to European Patent Application No. 20182610.4 filed on Jun. 26, 2020. The entire contents of the above-listed application is hereby incorporated by reference for all purposes.

TECHNICAL FIELD

The invention relates to a separating device, a device for feeding bases that have been cut, and a corresponding method for a separating device.

BACKGROUND AND SUMMARY

In the production of fresh products, e.g., foods such as ground meat, burgers, patties etc., paper, film material, or the like are underlaid in the packaging or as an intermediate layer for stacked products to prevent the products from sticking to one another, but also from sticking to conveyor belts or to the packaging. Moisture-absorbing bases, so-called non-woven materials, with which excess moisture is bound in the packaging can also be used as bases. This prevents, firstly, liquid from becoming visible in the packaging and, secondly, that the inner side of the packaging fogs up so that the packaged food is then no longer clearly visible.

These bases are provided, for example, from a supply roll and are then cut into individual bases. It has been found difficult to continuously cut the bases at great speed and deliver them to the products. This is particularly difficult when the bases are delivered to the products at a separation point between two conveyor belts. For this purpose, the base can be pushed through between the conveyor belts to the extent that a freshly produced product, for example a burger, runs onto the base during passage, e.g., without reducing its speed or without being stopped, and takes the latter along. The base can already be severed to the required length when it is taken over by the product. However, it is also possible for the base to be cut while the base is taken along by the product, e.g., during passage, in particular if the required length of the base is greater than the region from the leading edge of the provided base to the next separating point. In this case, the base can be cut to the desired length during the base advancement, while the advancement speed is reduced, or during a brief stop of the advancement. The product is there not stopped, which however, leads to a brief and slight relative motion between the product and the base.

It is there difficult to sever the base webs at high speed since, when using a knife, it must always be moved back before a new cut can be made. Rotating knife rollers with counter blades are also already known, for example, from CN 207189772. The paper there passes the cutting point substantially tangentially to the rotating cutting knife. The problem can arise there that the cutting pressure is not sufficient to sever the material quickly and reliably, in particular if the material is stronger.

The previous solutions are inflexible and too slow to be able to quickly and reliably provide bases at the required length and with high positioning accuracy to the products for products that are manufactured with high portioning capacity.

Proceeding from there, the present invention is based on the object of providing a separating device and a method which enable reliable cutting of a base web into individual bases at high speed.

According to the invention, this object is satisfied by a separating device, a device for feeding cut bases under a fresh product, and a method for a separating device.

According to the present invention, a separating device for cutting a base web into individual bases which can be guided under a fresh product comprises a knife device and a counter cutting device. The knife device and the counter cutting device each comprise at least two cutting edges, where the knife device and/or the counter cutting devices are movable to and fro in two directions. This means that the knife device comprises at least one knife with two cutting edges that, when viewed in the direction of movement, are spaced apart. The present invention has the advantage that a very high portioning capacity is possible because the cutting edges can be used alternately and, e.g., the knife device does not need to be moved back completely, like in prior art, in order to then carry out a new cut again with the forward motion. The knife device and the counter cutting device are moved relative to one another such that, after a cut, the advancement path of the base web is freed again without the knife device and/or the counter cutting device having to be moved back.

The knife device and the counter cutting device are configured and arranged such that a cut of the base web can be produced when the knife device is moved in the forward direction and/or the counter cutting device is moved in the reverse direction, or the knife device is moved in the reverse direction and/or the counter cutting device is moved in the forward direction. This means that either the knife device is moved to and fro or the counter cutting device or both devices are moved relative to one another. In this way, the cutting edges of the knife device and the counter cutting device can move towards one another and shear off the base web.

Cutting by shearing is particularly advantageous because, contrary to prior art, no great pressing force is necessary and safe and easier severing is possible.

The base web can be cut with the respective first cutting edge during the forward motion of the knife device and the reverse motion of the counter cutting device and by the respective second cutting edge during the reverse motion of the knife device and the forward motion of the counter cutting device.

This means that the first and second cutting edges are used alternately during the to and fro motion. The first cutting edge of the knife device and the counter cutting device is the cutting edge which when viewed in the forward direction (e.g. in the conveying direction of the fresh products) is the leading one and the second cutting edge is the cutting edge which in the forward direction is the trailing one for the base section to be severed.

According to an embodiment, the counter cutting device comprises a passage opening with an insertion end at which the base web can be inserted and an exit end at which the base web can exit or be pushed out, where the cutting edges are arranged at the exit end on opposite sides of the passage opening. The passage opening has the advantage that the base web can be guided in the passage opening and thereby be stabilized and if, for example, a knife of the knife device moves over the passage opening and/or the passage opening moves through under the knife, the passage opening can be freed again after a cut at least such that the base web can be pushed through the passage opening. The passage opening therefore has two functions, namely guiding the base web and cutting by way of the respective cutting edge.

It is particularly advantageous to have the counter cutting device be movable to and fro and the counter cutting device be arranged in the advance direction of the base web upstream of the knife device, because there is more space for movement there.

It is particularly advantageous to have the passage opening taper from the insertion end to the exit end, in particular taper conically. The passage opening then has a larger dimension at the insertion end such that the base web can be easily fed. Once the base material has been severed, the advancement path is immediately free again in this solution due to the smaller dimension of the passage opening at the exit end and the base material required for the subsequent portion can be reliably guided and immediately conveyed in. A conical extension of the oppositely disposed side walls of the passage opening at least in the exit end also enables, for example, an improved configuration of the cutting edges. The distance between the cutting edges may be in a range from 0.5 mm to 10 mm, such as 1 mm to 5 mm.

The knife device can then comprise one or more individual knives, where the individual knives each comprise two cutting edges. The individual knives are then arranged consecutively in the direction of movement. The cutting speed can then be further increased by arranging several individual knives, since the base web can be cut in quick succession by the second cutting edges of the respective individual knife of the knife device e.g. when moving the knife device in the forward direction, and with the reverse motion, the base web can be cut in quick succession by the first cutting edges of the knife device. It is also advantageous that an opening region is provided between the individual knives such that the base web can be guided through the knife device. If only a single knife is provided, then the base web can be guided laterally past the knife.

It is therefore possible that the base web can be cut successively during the forward motion of the individual knives of the knife device and/or during the reverse motion of the counter cutting device by the individual knives by a respective second cutting edge of the knife device and a second cutting edge of the counter cutting device, and the base web can be cut successively during the reverse motion of the individual knives of the knife device and/or during the forward motion of the counter cutting device by the individual knives by a respective first cutting edge of the knife device and the first cutting edge of the counter cutting device.

The individual knives are advantageously arranged to be linearly movable or else to rotate. The counter cutting device can also be arranged to be linearly movable or else to rotate. If the individual knives are arranged to rotate, then it is advantageous to have the counter cutting device be arranged in a stationary or rotating manner (e.g., the knife device rotates e.g. about the same axis as the counter cutting device) such that the cutting edges of the knife device and the counter cutting device move past one another and can shear off the base web.

According to a preferred embodiment, the cutting edges of the knife device and the cutting edges of the counter cutting device do not run parallel to one another, but in particular at an angle of 0.5° to 3°. This has a respective positive influence on the cutting result. The cutting edges of the counter cutting device advantageously run at an angle of 1° to 2° with respect to the cutting edges of the knife device.

The invention also relates to a device for feeding cut bases under a fresh product with a separating device as described above and two transport devices, in particular conveyor belts, for the fresh product, and a conveyor device for feeding the base web to the separating device. The separating device is arranged such that the base web can be guided between the transport devices and the fresh product can be applied to the base. For this purpose, the base web is e.g. pushed through between the transport devices to the extent that a freshly produced product, e.g., a burger, runs onto the base and takes it along. The base can there already be cut off to the required length when it is taken over by the product. However, it is also possible for the base to be cut while the base is taken along by the product.

It is possible for the device to comprise a control device which adjusts the advancement distance in dependence of the position of a counter cutting device (in particular of an angle of rotation of a moving, in particular rotating, counter cutting device, in particular of a shaft position of the counter cutting device). The advancement distance is understood to be the distance that the free leading end of the base web travels after a cut up to point of provision B on the downstream transport device, e.g., the distance between the cutting edges and a point of provision B on the downstream transport device at which the fresh product runs onto the base web. If the counter cutting device moves to and fro, in particular rotates, a different advancement distance to the position of provision arises for the base web. The control device can compensate for the different advancement distances by adapting the advancement distance that the base web travels to the point of provision. For this purpose, for example, the speed at which the base web is conveyed by the conveyor device can be set accordingly, e.g., be adapted. This means, for example, that with a longer distance, the conveyor device can convey the base web a little further or a little faster than with a shorter distance.

The control device can also adjust the point in time of the cut accordingly in order to obtain the correct length of the base.

The transport device advantageously comprises oppositely disposed transport rollers, at least one of which is driven. One of the transport rollers can have a non-cylindrical, e.g. a concave outer contour, and the oppositely disposed transport device a correspondingly complementary non-cylindrical, e.g. a convex outer contour. This enables the base web, e.g., a paper or film web, to be slightly curved, e.g., kinked, which improves the rigidity, and therefore leads to increased stability, improved advancement, and therefore better process reliability.

In a method according to the present invention, both the knife device and the counter cutting device each comprise at least two cutting edges, where the base web is cut when the knife device moves in the forward direction and/or the counter cutting device in the reverse direction and when the knife device is moved in the reverse direction and/or the counter cutting device in the forward direction such that a cutting edge of the knife device and a cutting edge of the counter cutting device are moved towards one another to produce a cut and thereby shear off the base web.

The device comprises a control device which actuates the conveyor device for feeding the base web and the transport devices for the fresh product as well as the separating device and adapts the functions, in particular the speeds (or the timing of the separating device), to one another.

The feed of fresh products can be irregular due to production. It is therefore advantageous to have the incoming fresh product, in particular the incoming fresh product portion, be detected by way of a sensor. The control device controls e.g. the conveyor devices for feeding the base web and the separating device in dependence of the position detected by the sensor. It can then always be ensured that the bases are always fed at the correct point in time and in the correct length when the fresh product portions are fed in irregularly.

The knife device and/or the counter cutting device can be moved continuously to and fro in two directions. The advancement and separating process can also be carried out continuously. This results in an ongoing, in particular substantially continuous, process, where the transport speed of the base web, however, can be constant or changed periodically or can also be reduced or temporarily stopped in the meantime.

After a cut, the knife device and/or the counter cutting device can continue to move such that the advancement path for the base web is free again without the knife device and/or the counter cutting device having to be moved back for this purpose.

BRIEF DESCRIPTION OF THE FIGURES

The present invention shall be explained in more detail with reference to the following figures.

DETAILED DESCRIPTION

Figure 1:
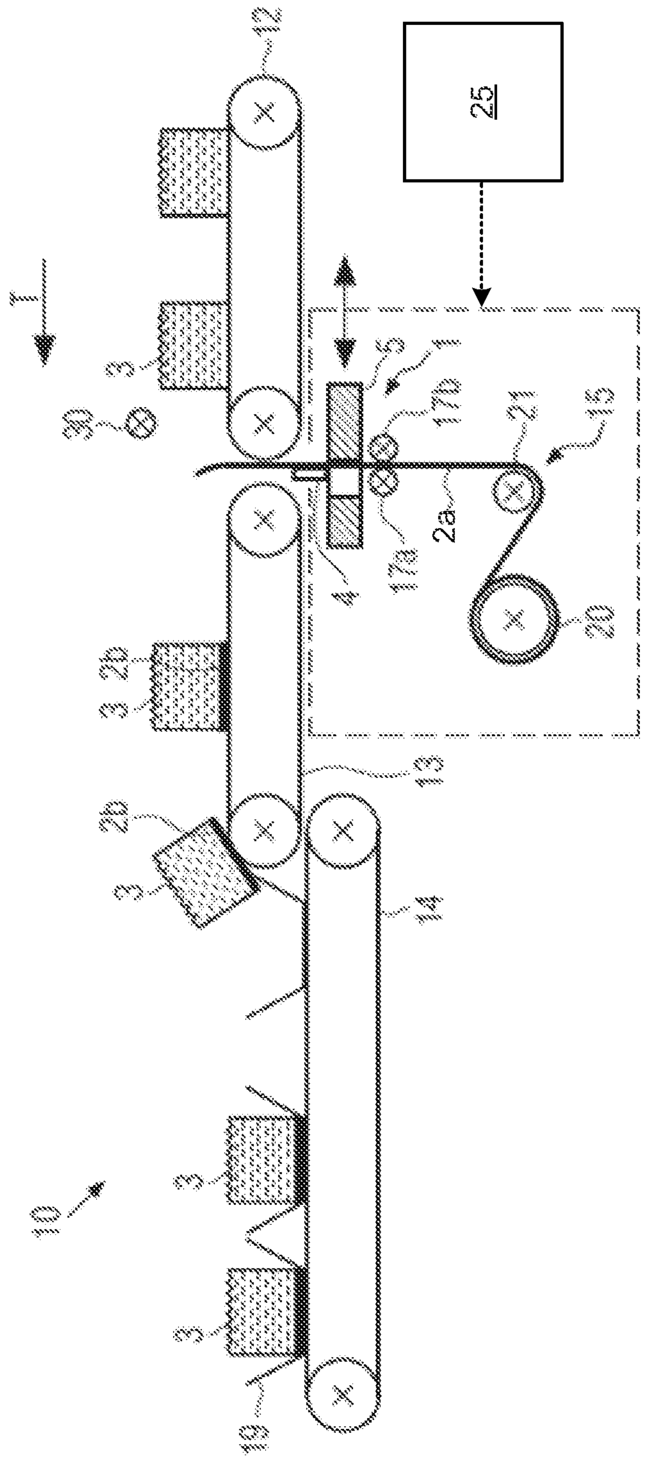
FIG. 1 shows in a simplified schematic representation an embodiment of a device for feeding bases that have been cut.

FIG. 1 shows in a simplified schematic representation a device 10 for feeding cut bases 2*b* under a fresh product 3. In this application, fresh product is understood to mean, for example, ground meat, burgers, patties, etc., but also meatless products such as pieces of cheese. As shown in FIG. 1, these fresh products can be supplied in portions. A base, for example, in the form of paper, a plastic film, or a liquid-absorbing base, for example, non-woven material, is placed underneath the product.

Device 10 comprises a first transport device 12, presently a conveyor belt, via which fresh products 3 that have already been portioned are transported in a direction of transport T. The fresh products are transferred from first transport device 12 to a second, spaced transport device 13. A further transport device 14 can be arranged in direction of transport T downstream of second transport device 13, which is presently likewise configured as a circulating conveyor belt, and presently be disposed, for example, a little lower, in which the product can be introduced together with the base into a packaging, presently container 19.

The device further comprises a conveyor device 15 for feeding base web 2*a* to separating device 1. Conveyor device 15 comprises a supply roll 20 onto which base web 2*a* is wound. The base web can be conveyed, for example, by way of conveyor rollers 17*a*, 17*b*, of which at least one is driven and which convey the base web in the direction of the separating device. Supply roll 20 can be driven and be decoupled from transport rollers 17*a*, 17*b* by a loop formed by the base web. Base web 2*a* can be held subject to tension in this loop by a so-called dancer roller 21 which is mounted to be movable. Dancer roller 21 also serves to regulate the supply from the supply roll. As is generally known from prior art, the base web is drawn off from the supply roll in dependence of the position of the dancer roller.

The feed of the base web to the fresh products is preferably effected at a separation point between two conveyor belts 12 and 13. The feed takes place during passage, e.g., while fresh products 3 pass the separation point in direction of transport T. For this purpose, base web 2*a* can be pushed through between conveyor belts 12, 13 to such an extent that a fresh product 3 that has been supplied, for example a burger, runs onto the base and takes the latter along. For example, the product can run onto the base without reducing its speed or without being stopped.

Base 2*b* can already be severed to the required length when it is taken over by product 3. However, if, for example, the base is to protrude at the rear region of the fresh product, it is also possible for base web 2*a* to be cut while the base is already being taken along by the product, for example, during passage. The base web can be cut to the desired length while it is being transported (where the advance speed can also be reduced) or during a brief stop of transportation.

Figure 2A:
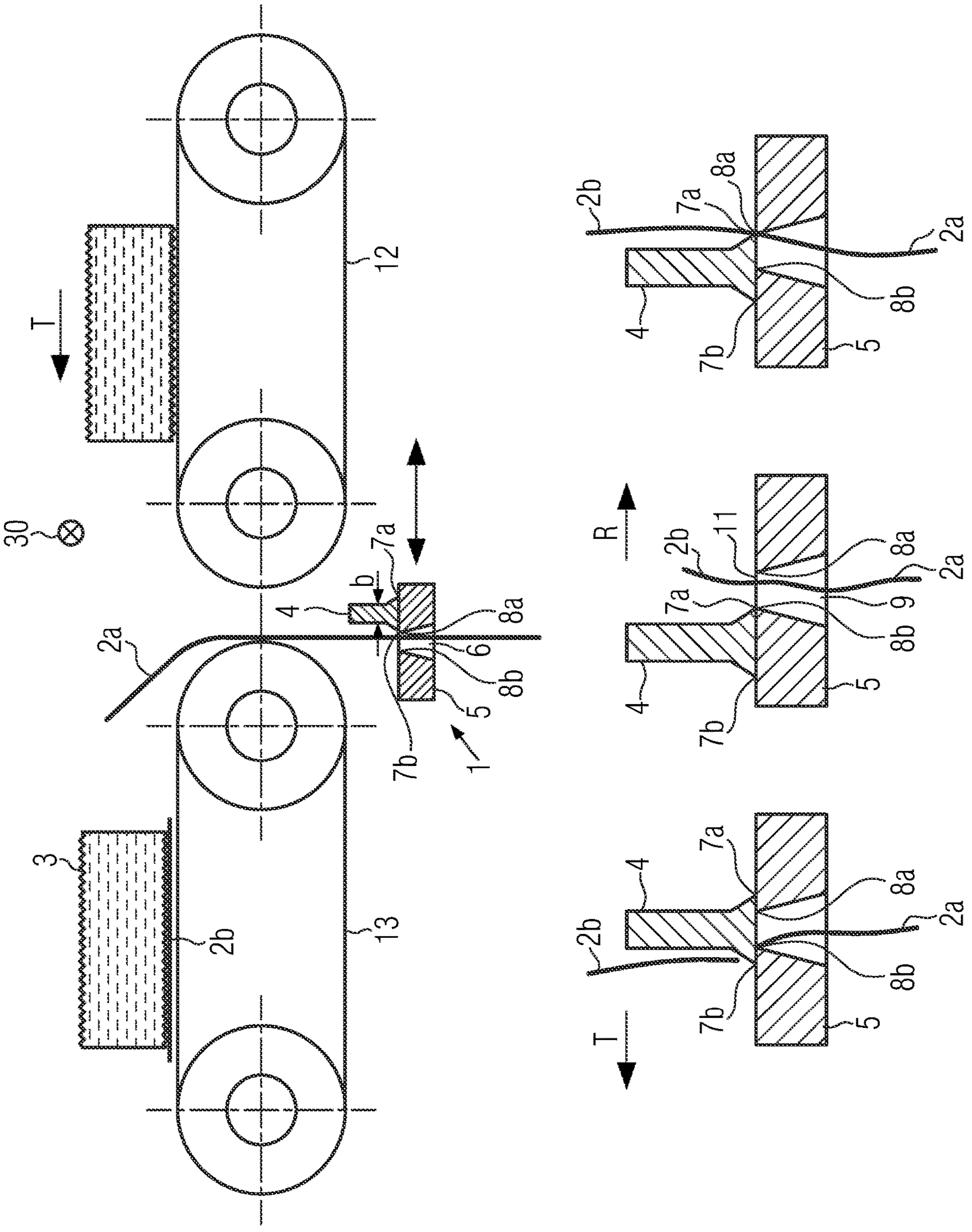
FIG. 2*a* schematically shows a separating device according to a first embodiment.

Separating device 1 for cutting base web 2*a* shall be explained in more detail in the embodiment shown in FIG. 2*a*. Separating device 1 comprises a knife device 4 and a counter cutting device 5. Knife device 4 presently comprises a single knife which comprises two cutting edges 7*a* and 7*b* spaced apart at the end facing counter cutting device 5. For this purpose, for example, the individual knife can have oppositely disposed inclined sections at the lower region such that a knife width b widens in the direction of counter cutting device 5 so that a cutting edge tapering to a point can be formed. The cutting edges are e.g. 1 mm to 10 mm apart.

Counter cutting device 5 also has two cutting edges 8*a* and 8*b* spaced apart on the side facing knife device 4. Cutting edges 7*a*, 7*b*, 8*a*, 8*b* have at least one length which corresponds to the width of base web 2*a* to be cut.

A passage opening 6 is there formed in counter cutting device 5 having an insertion end 9 at which base web 2*a* can be inserted and an exit end 11 at which the base web can exit, where cutting edges 8*a*, 8*b* are arranged opposite one another at exit end 11. Passage opening 6 can taper conically from insertion end 9 to exit end 11, in particular at least in the region of the exit end, where the spacing between the cutting edges is in a range from 1 mm to 10 mm. Passage opening 6 guides base web 2*a*. Due to the conical configuration, firstly, guidance towards the exit end is improved so that the exit position is disposed in a defined region and, secondly, a pointed cutting edge can be created in a simple manner by the inclined extension of the side walls of counter cutting device 5.

According to the present invention, knife device 4 and/or counter-cutting device 5 can be moved to and fro in two directions, as shown by the arrow in FIG. 2*a*. In the embodiment shown in FIG. 2*a*, for example, counter cutting device 5 can be arranged to be movable to and fro. For this purpose, a drive (not shown), for example, a linear drive of any kind, such as a servo drive, can be provided. Knife device 4 is then, for example, fixedly arranged between transport devices 12 and 13. Knife device 4 may extend into a region of the oppositely disposed rollers of transport devices 12 and 13. If counter cutting device 5 is now moved in a reverse direction R under knife device 4, e.g., presently in a direction opposite to direction of transport T, then second cutting edge 8*b* moves toward second cutting edge 7*b*, presently in a linear manner, and shears off base web 2*a*, as can be seen from the illustration of FIG. 2*a* on the left-hand side. Counter cutting device 5 continues to move until passage opening 6 at exit end 11 is free again at least in part such that base web 2*a* is transported onward, e.g., meaning that it is presently pushed upwardly by transport device 15, as shown in the illustration in FIG. 2*a* at the center. Counter cutting device 5 can then again be moved in the forward direction, e.g., presently along direction of transport T, such that cutting edges 7*a* and 8*a* move towards one another and finally shear off base web 2*a* into individual bases 2*b*, as shown in the illustration in FIG. 2*a* on the right-hand side. Counter cutting device 5 is then moved onward again accordingly until the region at exit end 11 of the passage opening is free again, such that the base web can be advanced upwardly, as shown in the illustration at the center, in order to then be severed again by edges 7*b* and 8*b*.

Due to passage opening 6 tapering from insertion end 9 to exit end 11, base web 2*a* can be easily inserted from the entry side and at the same time the region at exit end 11 can be quickly freed again.

Figure 2B:
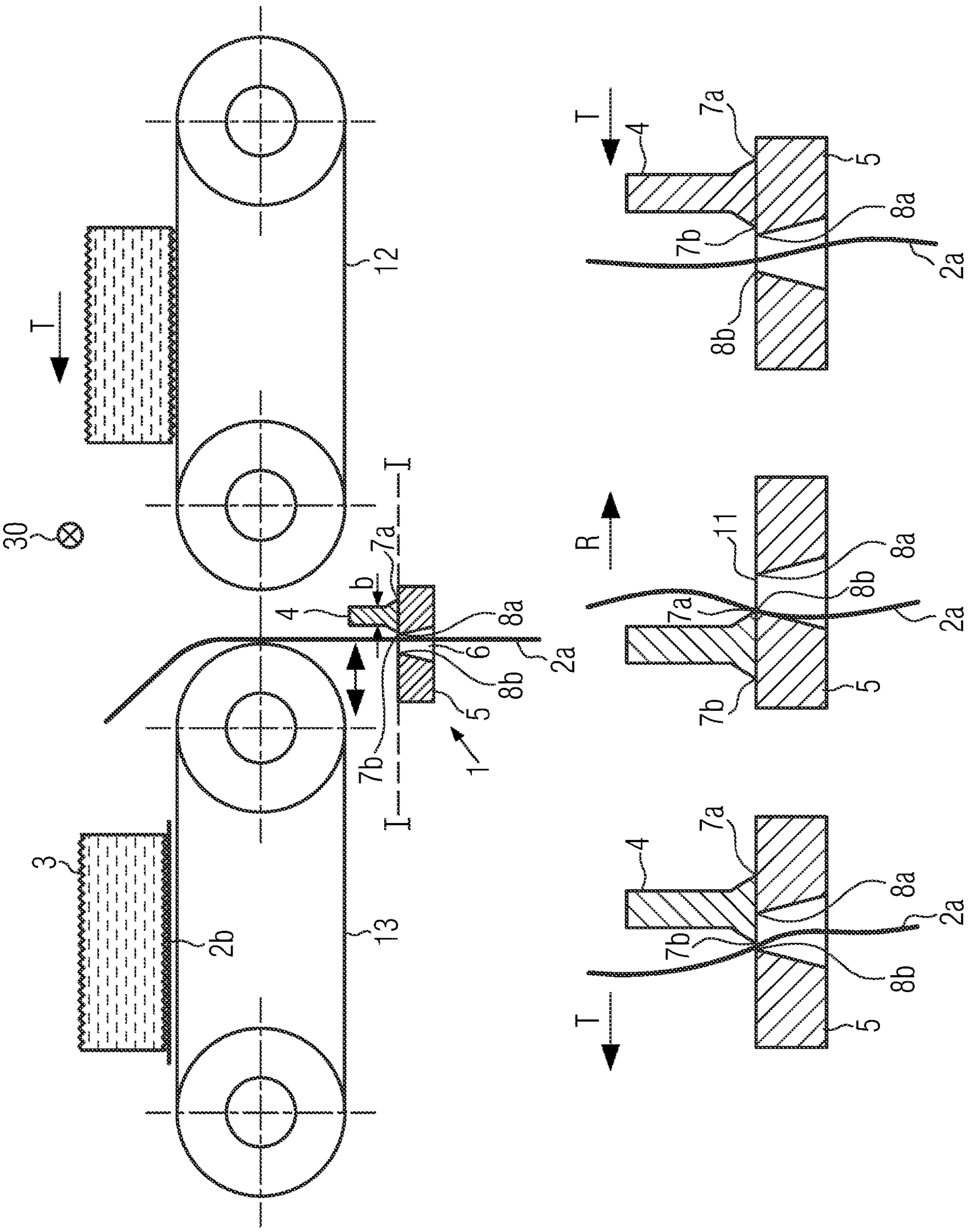
FIG. 2*b* shows in a simplified schematic representation a separating device according to a further embodiment.

FIG. 2*b* shows a further embodiment which corresponds to the embodiment shown in FIG. 2*a*, where counter cutting device 5 there, however, is stationary and knife device 4 is arranged to be linearly movable. As can be seen from the illustration on the lower left-hand side, knife device 4 moves in the forward direction, e.g., in direction of transport T starting out from the upper illustration such that cutting edges 7*b* and 8*b* can move towards each other and shear off base web 2*a*. In the illustration at the center, knife device 4 has already moved in direction of transport T to the extent that the region at exit end 11 of passage opening 6 is free again and further advancement of base web 2*a* is possible, as can be seen from the illustration at the center.

Knife device 4 now begins to move in the reverse direction such that first cutting edges 7*a*, 8*a* move towards one another and sever base web 2*a*. As shown in the figure on the right-hand side, the knife can then move onward in reverse direction R until region 11 is free again and base web 2*a* can be advanced further. Knife device 4 can then be moved again in the forward direction, presently transport direction T, such that cutting edges 7*b* and 8*b* again move towards one another.

As has been described in the context of FIGS. 2*a* and *b*, this means that base web 2*a* can be cut, in particular continuously, into individual bases 2*b*, where knife device 4 and/or counter cutting device 5 move continuously to and fro in two directions T, R. It is also possible for both devices, e.g., knife device 4 and counter cutting device 5, to move to and fro and to each move towards one another for the cutting process. It is particularly advantageous to have only the counter cutting device be arranged to be movable since there is more space for free movement in a lower region under transport devices 12, 13 than between the rollers of transport devices 12, 13.

Figure 2C:
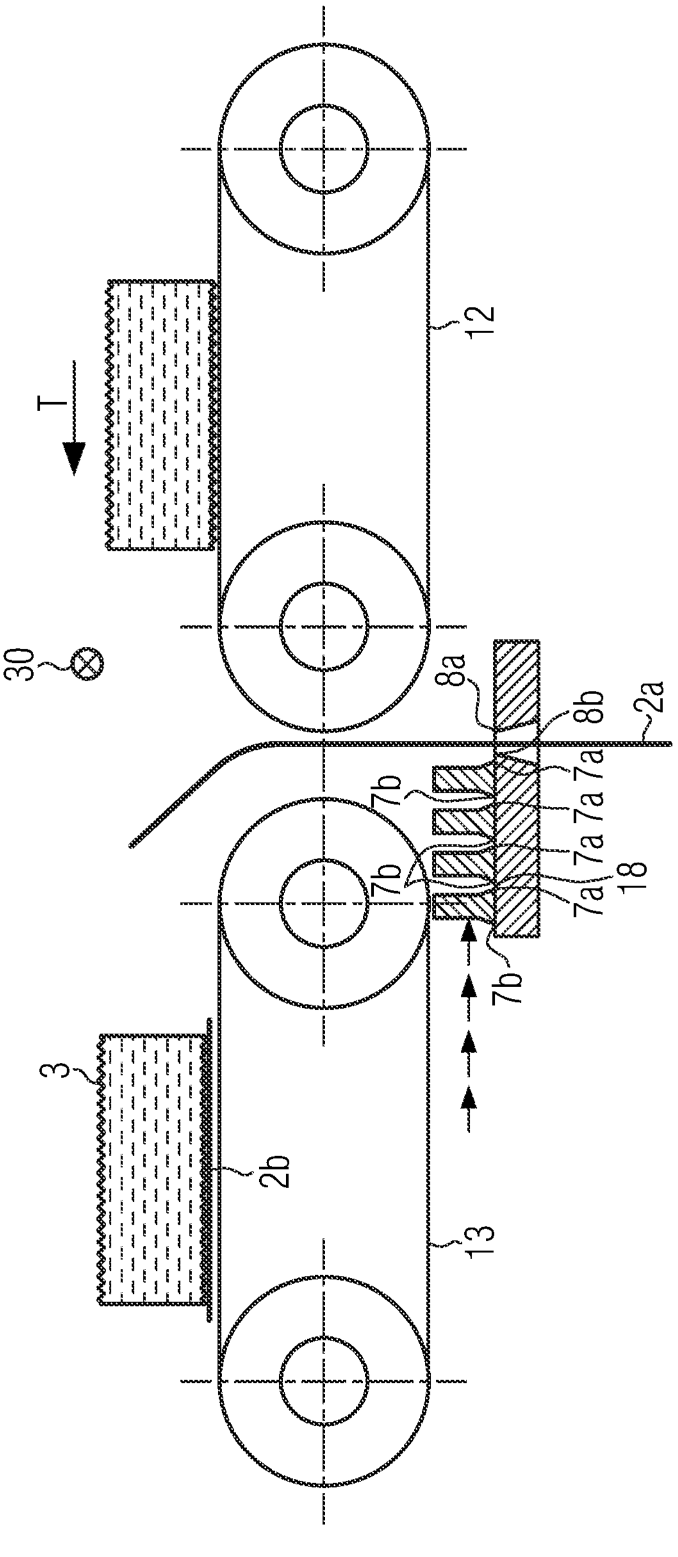
FIG. 2*c* shows in a simplified schematic representation a separating device according to a further embodiment.

FIG. 2*c* corresponds substantially to the embodiments shown in FIGS. 2*a* and 2*b*, with the exception that knife device 4 there comprises several individual knives, each with two cutting edges 7*a*, 7*b*. Respective opening regions are arranged between the individual knives such that base web 2*a* can be pushed through these regions before base web 2*a* is cut by the individual knife that is the subsequent one when viewed in the direction of movement of the individual knives. As illustrated by the arrow, this means that the individual knives are moved linearly over the counter cutting device and its cutting edges in order to accomplish several cuts in quick succession. As shown in the context of FIG. 2*b*, in this embodiment as well, the counter cutting device could in principle be arranged to be linearly movable and knife device 4 could be arranged in a stationary manner or both the knife device as well as the counter cutting device can also be arranged to be movable to and fro such that cutting edges 7*a*, 8*a* and 7*b*, 8*b* can move towards one another and shear off base web 2*a*. The number of knives can be, for example, up to 6 knives.

Figure 3A:
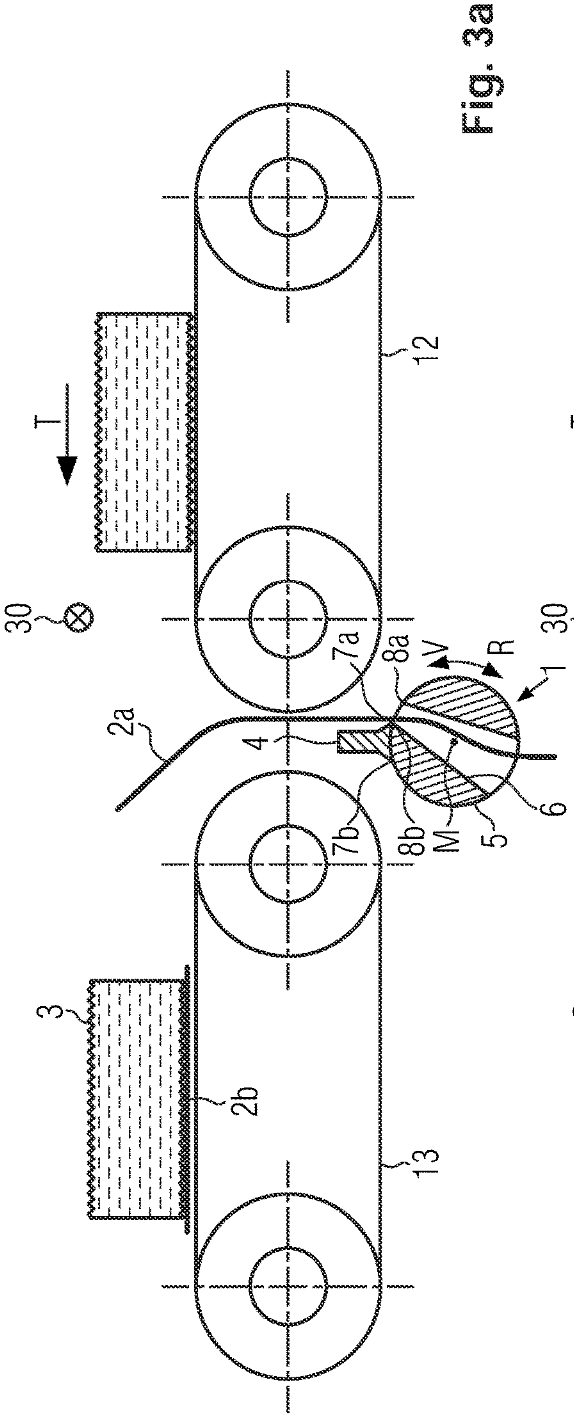
FIG. 3*a* shows in a simplified schematic representation a separating device according to a further embodiment.

FIG. 3*a* show a further embodiment according to the present invention. The embodiment shown in FIG. 3*a* corresponds substantially to the embodiment shown in FIGS. 2*a* and 2*b* with the exception that counter cutting device 5 is there not arranged to be linearly movable but is instead arranged to be rotatable about a central axis M in two directions R, V. Passage opening 6 with cutting edges 8*a* and 8*b* can therefore be moved to and fro beneath stationary knife device 4 such that cutting edges 8*b* and 7*b* move towards one another during the rotational motion in direction R and shear off base web 2*a*, and cutting edges 8*a* and 7*a* move towards one another with a motion in direction V and shear off base web 2*a*. The counter cutting device can there have a cylindrical outer contour and the knife device can have a substantially complementary shape in the facing region such that the two devices 4, 5 can slide past one another. As already described in the context of the other embodiments, counter cutting device 5 is respectively rotated so far beneath knife device 4 that passage opening 6 at exit end 11 is freed again and an advancement of the base web out of counter cutting device 5 is possible.

Figure 3B:
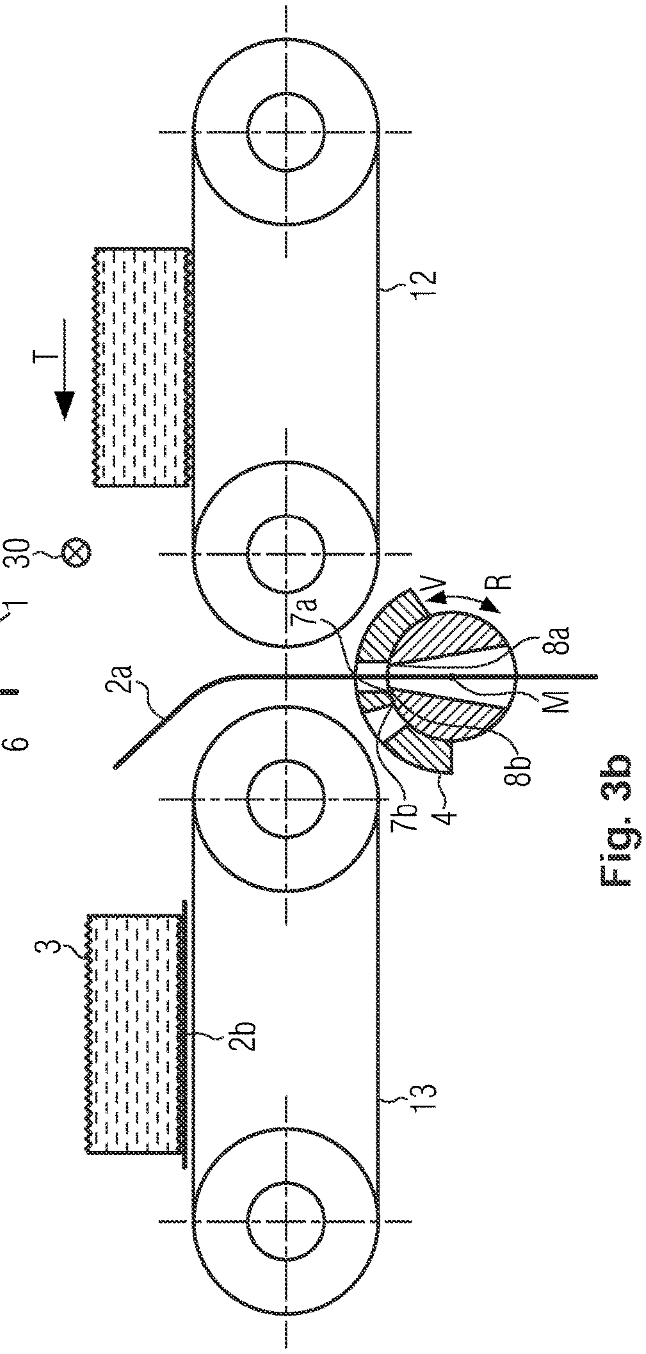
FIG. 3*b* shows in a simplified schematic representation a separating device according to a further embodiment.

FIG. 3*b* corresponds substantially to the embodiment shown in FIG. 3*a*, where knife device 4 is there configured such that at least one individual knife is arranged rotatable about central axis M, while the counter cutting device is stationary. The individual knife there moves to and fro between cutting edges 7*a* and 7*b* respectively over the passage opening in the directions, presently directions of rotation R and V, and then cuts base web 2*a* as explained above.

Figure 3C:
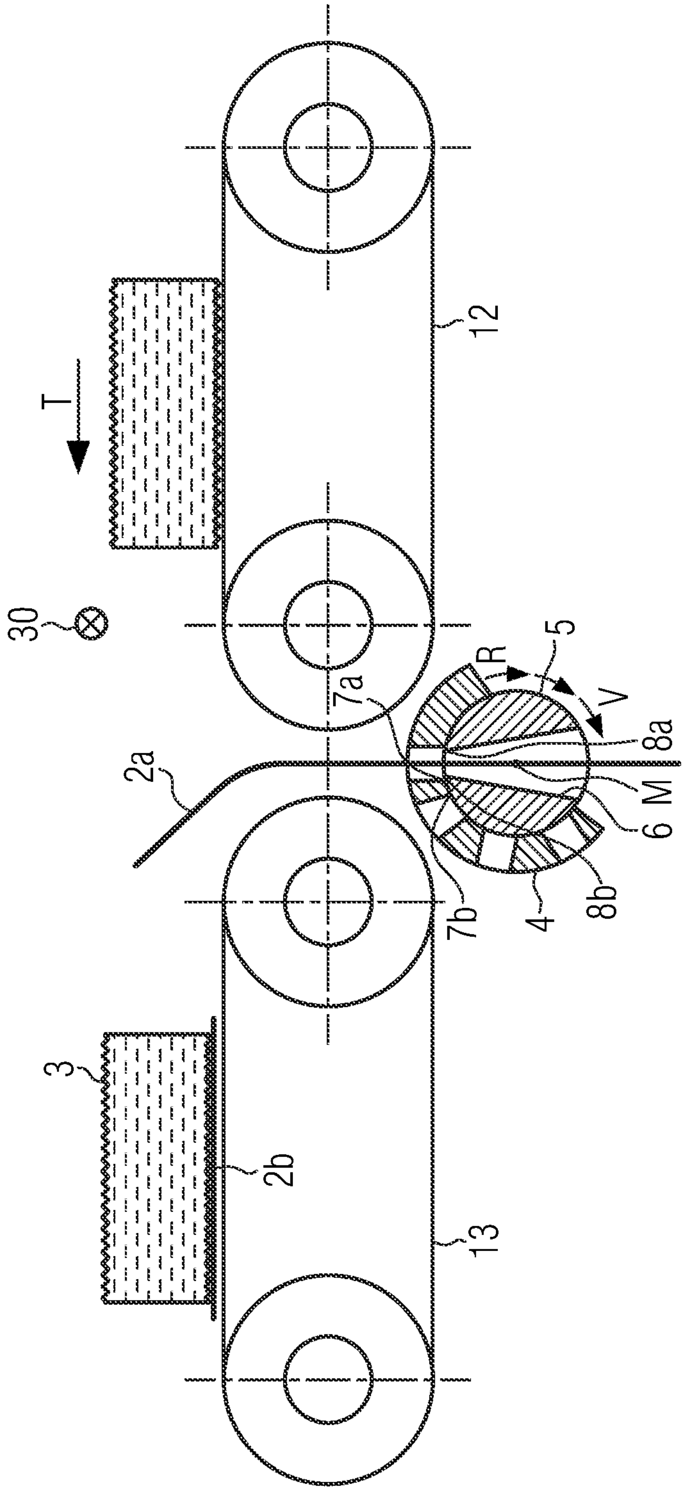
FIG. 3*c* shows in a simplified schematic representation a separating device according to a further embodiment.

FIG. 3*c* shows a further embodiment which corresponds to the embodiment shown in FIG. 3*b*, where the knife device presently comprises several individual knives which are also arranged rotatable about axis M and can be moved to and fro successively over passage opening 6. Counter cutting device 5 can there be arranged in a stationary manner. Here as well, a respective opening is provided between the individual knives through which base web 2*a* can move.

In FIGS. 3*b* and 3*c*, however, it is also possible that knife device 4 as well as counter cutting device 5 are arranged to be rotatable to and fro such that the cutting edges can move towards one another.

Figure 5:
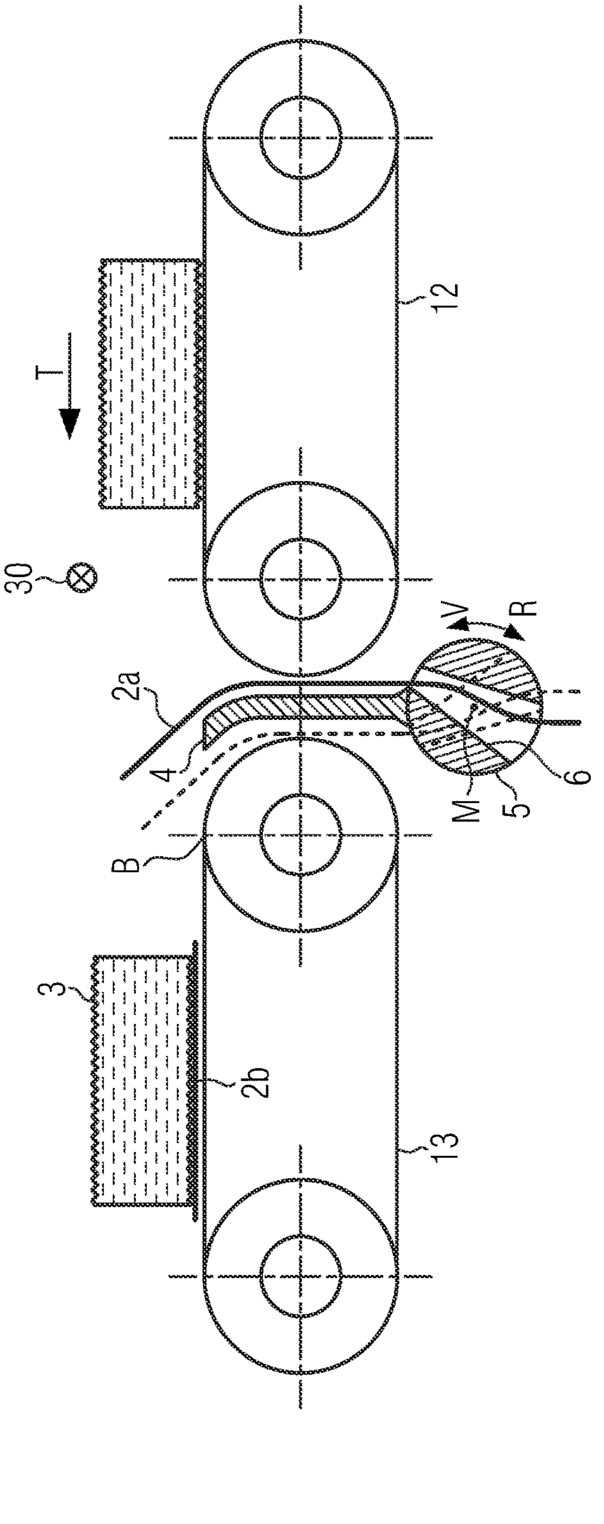
FIG. 5 show in a simplified schematic representation a further embodiment according to the present invention.

FIG. 5 shows an embodiment which corresponds substantially to the embodiment shown in FIG. 3*a*. Knife device 4 is drawn so far up between transport devices 12 and 13 that it can serve as a guide. As shown by the dashed lines, counter cutting device 5 can be moved to and fro between the two outer positions. The different positions result in advancement distances of different lengths for the base web, in particular up to provision position B on transport device 13 at which fresh product 3 can rest on the base web. The necessary correction in the advancement distance is carried out, for example, by controlling the feed rollers by way of software in dependence of the corresponding angle of rotation or the position of the counter cutting device, e.g., for example, the advancement distance in the position shown in dashed lines can be shorter than the advancement distance in the rotational position, which is shown to be continuous.

A different advancement distance can also arise with a counter cutting device that moves linearly to and fro and can then likewise be corrected accordingly.

Figure 4:
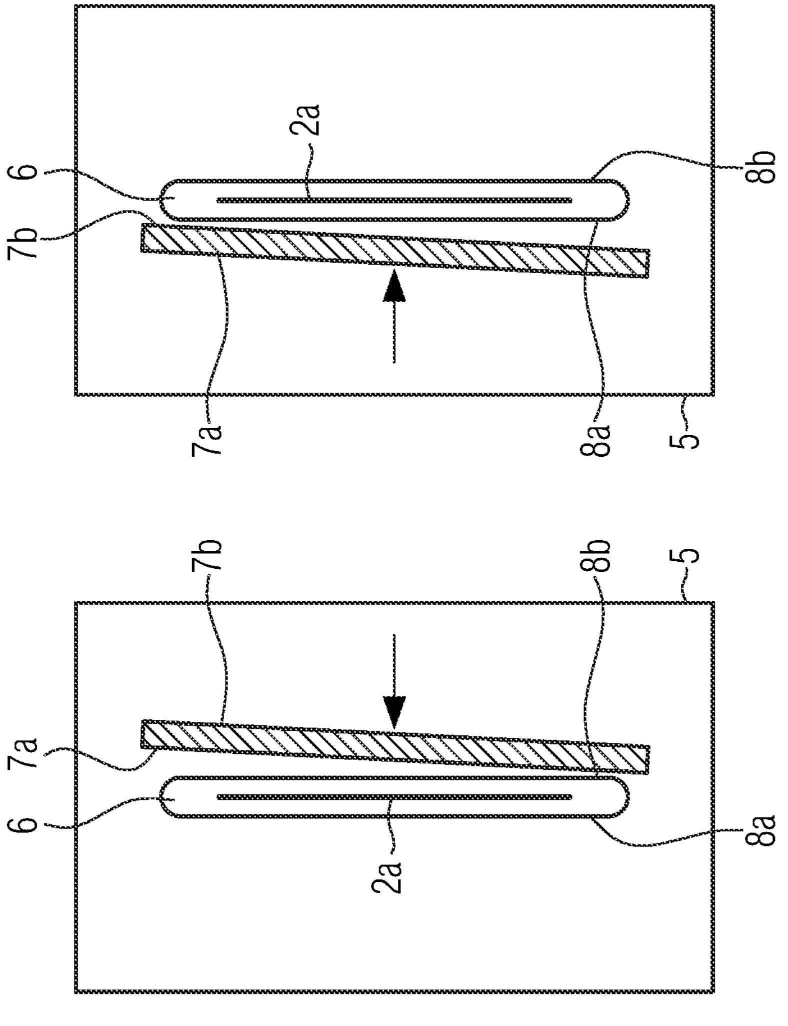
FIG. 4 shows in a simplified schematic representation the cutting edges of the knife device and the counter cutting device in cross section.

FIG. 4 shows in a simplified schematic representation a section through the separating device, for example, along line I-I. in FIG. 2*b*. It can be seen there that cutting edges 7*a*, 7*b* do not run parallel to cutting edges 8*b* and 8*a*, but at an angle of 0.5° to 3°, preferably 1° to 2°. This increases operational reliability even more.

Figure 6A:
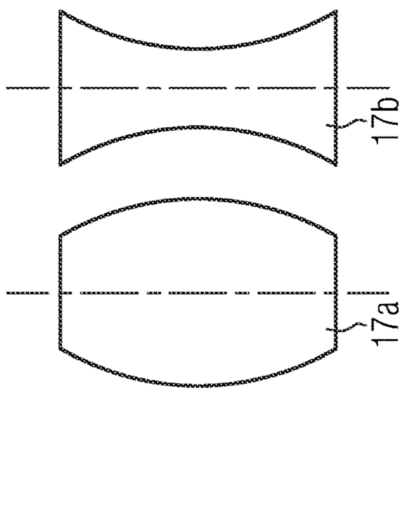
FIGS. 6*a* and 6*b* each show a cross section through transport rollers for the base web according to a preferred embodiment.
Figure 6B:
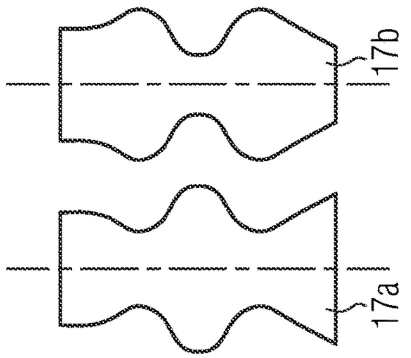

FIGS. 6*a*, 6*b* show a cross section through transport rollers 17*a*, 17*b*, as they are shown, for example, in FIG. 1. In order for the base web to have a certain rigidity, conveyor roller 17*a* can have a non-cylindrical, for example, a convex outer contour and conveyor roller 17*b* can have a complementary non-cylindrical, e.g. concave outer contour. This makes the base web assume a corresponding shape and thereby gives it even more stability such that the advancement of the base web works even better.

In the method according to the invention, base web 2*a* is fed by way of conveyor device 15 and guided by passage opening 6 of the counter cutting device. Base web 2*a* is cut when the knife device moves in the forward direction V and/or the counter cutter device moves in reverse direction R, or vice versa. To produce a cut, for example, cutting edge 7*a*, which in the direction of movement is the leading one, moves towards the respective leading cutting edge 8*a* of counter cutting edge 5 and shears off base web 2*a* to form an individual base 2*b*. Knife device 4 or the counter cutting device moves continuously to and fro in two directions so that a continuous cutting process can be implemented. After the cut, knife device 4 and/or counter cutting device 5 continues to move such that the advancement for base web 2*a* is free again, e.g., passage opening 6 in exit area 11 is free. Base web 2*a* can then be advanced again and base web 2*a* can be cut.

Base web 2*a* is pushed between two transport devices 12 and 13 up into an upper region, where fresh product 3 is pushed onto base web 2*a*, 2*b* and takes it along. At this point in time, either base web 2*a* can already be cut or, in particular if the base web is to protrude to the rear underneath the product, it can be cut only once fresh product 3 has already run up.

The device comprises a control device 25 which actuates conveyor device 15 for feeding the base web and transport devices 12, 13 for the fresh product as well as separating device 1, and adapts the functions, in particular the speeds, to one another.

In the embodiments shown above, the feed of fresh products can be irregular due to production. It is therefore advantageous to have the incoming fresh product, in particular the incoming fresh product portion, be detected by way of a sensor 30 (in particular an optical sensor). The sensor is arranged, for example, in the region of the first transport device, presently conveyor belt 12, or in a region between transport devices 12, 13. For example, the sensor can detect when the fresh product portion arrives, e.g., detect the leading edge and forward this to the control device such that the control device knows the position of the fresh product. The control device then controls conveyor devices 15 for feeding the base web and separating device 1 in dependence of the position detected by sensor 30. It can then always be ensured that the bases are always fed at the correct point in time and in the correct length when the fresh product portions are fed in irregularly, e.g., a portion is always correctly positioned on the base. It is also possible to adapt the speed of transport devices 12, 13 accordingly.

According to a further embodiment, the length of the fresh product portion can also be detected by way of sensor 30 so that the length of the base can be adjusted accordingly if the lengths of the portions fluctuate, whereby material can be saved.

The knife device and/or the counter cutting device can be moved continuously to and fro in two directions. The advancement and separating process can also be carried out continuously. This results in an ongoing, in particular substantially continuous, process, where the transport speed of the base web, however, can be constant or changed periodically or can also be reduced or temporarily stopped in the meantime.

The invention claimed is:

1. A device for feeding cut bases under a fresh product, comprising:

a separating device for cutting a base web into individual cut bases, comprising a knife device and a counter cutting device, wherein said knife device and said counter cutting device each comprise at least two cutting edges and said knife device and/or said counter cutting device are configured to be moved to and fro in two directions;

two transport devices for said fresh product, wherein the fresh products are transferred from the first transport device to a second transport device, spaced in a transport direction; and a conveyor device for feeding said base web to said separating device, including a supply roll and conveyor rollers, wherein said separating device is arranged such that said base web is configured to be guided between said transport devices and said fresh product is configured to be applied onto said cut bases, wherein said counter cutting device comprises a passage opening disposed within the counter cutting device with an insertion end at which said base web is configured to be inserted and an exit end at which said base web is configured to exit, where said cutting edges of the counter cutting device are arranged opposite one another at said exit end.

2. The device according to claim 1, wherein said knife device and said counter cutting device are configured and arranged such that a cut of said base web is produced when said knife device is moved in a forward direction and/or said counter cutting device is moved in a reverse direction and said knife device is moved in the reverse direction and/or said counter cutting device is moved in the forward direction, wherein a first cutting edge of said knife device and a first cutting edge of said counter cutting device move towards each other and are configured to shear off said base web.

3. The device according to claim 2, wherein said base web is configured to be cut with the respective first cutting edges during the forward motion of said knife device and/or the reverse motion of said counter cutting device and by respective second cutting edges of the knife device and counter cutting device during the reverse motion of said knife device and/or the forward motion of said counter cutting device.

4. The device according to claim 1, wherein said passage opening tapers from said insertion end to said exit end.

5. The device according to claim 1, wherein said knife device comprises one or more individual knives, each with two cutting edges, where said one or more individual knives are arranged consecutively in a direction of movement and an opening is arranged between said one or more individual knives through which said base web is configured to be guided.

6. The device according to claim 5, wherein said base web is configured to be cut consecutively during a forward motion of said one or more individual knives of said knife device and/or a reverse motion of said counter cutting device by said one or more individual knives by a respective second cutting edge of said knife device and a second cutting edge of said counter cutting device, and wherein said base web is configured to be cut consecutively during the reverse motion of said individual knives of said knife device and/or the forward motion of said counter cutting device by said one or more individual knives by a respective first cutting edge of said knife device and a first cutting edge of said counter cutting device.

7. The device according to claim 5, wherein said one or more individual knives are arranged to be linearly movable or said one or more individual knives are arranged to rotate.

8. The device according to claim 1, wherein said counter cutting device is arranged to be linearly movable or said counter cutting device is arranged to rotate.

9. The device according to claim 1, wherein said cutting edges of said knife device do not run in parallel to said cutting edges of said counter cutting device.

10. The device according to claim 9, wherein said cutting edges of said knife device run at an angle of 0.5° to 3° to said cutting edges of said counter cutting device.

11. The device according to claim 1, wherein said device comprises a control device which adjusts an advancement distance in dependence of a position of said counter cutting device to advance said base web from the supply roll of said base web to a point of provision in dependence of a position of said counter cutting device, wherein said point of provision is a location at which said fresh product runs onto said cut bases.

12. The device according to claim 1, wherein said transport device comprises oppositely disposed transport rollers, and wherein one transport roller has a non-cylindrical outer contour and said oppositely disposed transport roller has a complementary non-cylindrical outer contour.

13. The device according to claim 1, wherein said device comprises a control device which actuates said conveyor device for feeding said base web and said transport devices for said fresh product and said separating device, and said control device further comprises a sensor for detecting a position of said incoming fresh product.

14. The device according to claim 13, wherein said conveyor device for feeding said base web and said separating device are actuated in dependence of the position detected by way of said sensor.

15. A method for cutting a base web with a knife device and a counter cutting device, wherein said knife device and said counter cutting device each comprise at least two cutting edges, comprising:

cutting said base web when said knife device moves in a forward direction and/or said counting cutting device moves in a reverse direction and when said knife device is moved in the reverse direction and/or said counter cutting device in the forward direction such that, for producing a cut, a cutting edge of said knife device and a cutting edge of said counter cutting device move towards each other and shear off said base web, wherein said counter cutting device comprises a passage opening disposed within the counter cutting device with an insertion end at which said base web is configured to be inserted and an exit end at which said base web is configured to exit, where said cutting edges of the counter cutting device are arranged opposite one another at said exit end.

16. The method according to claim 15, wherein cutting said base web comprises cutting said base web into individual bases, and wherein said knife device and/or said counter cutting device move to and fro in two directions.

17. The method according to claim 15, wherein, after a cut, said knife device and/or said counter cutting device continue to move such that an advancement path for said base web is free again without said knife device and/or said counter cutting device having to be moved back.

* * * * *